April 15, 1969 C. G. ROBINSON 3,439,104
APPARATUS FOR MELTING METALS BY RESISTANCE HEATING
Filed Sept. 22, 1966 Sheet 3 of 3
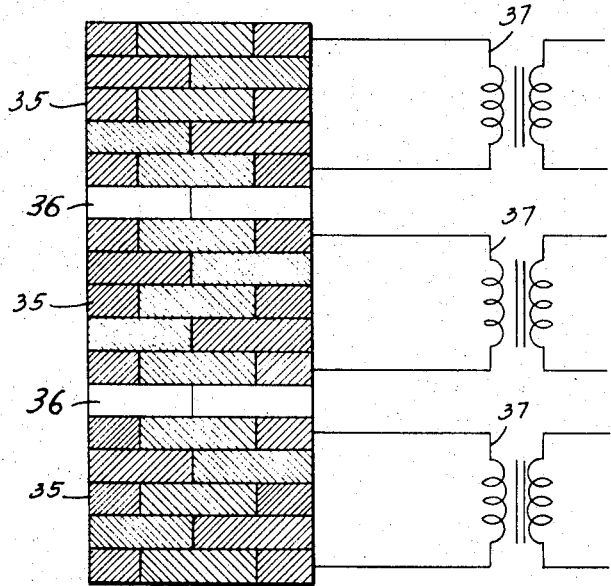
Fig-7
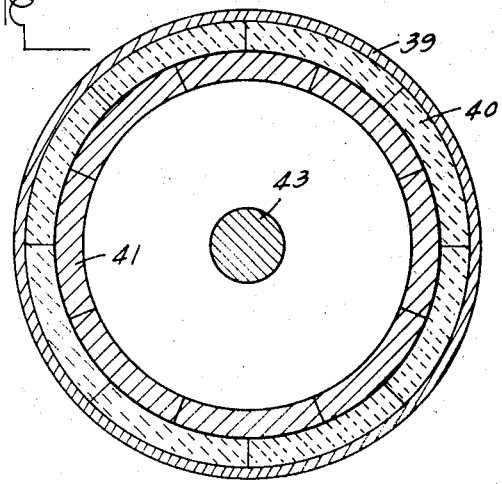
Fig-8
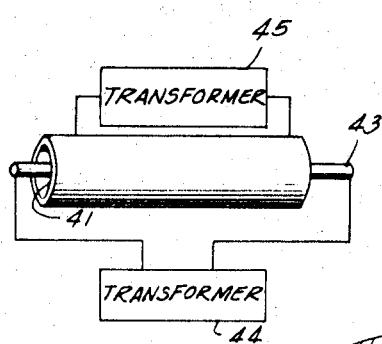
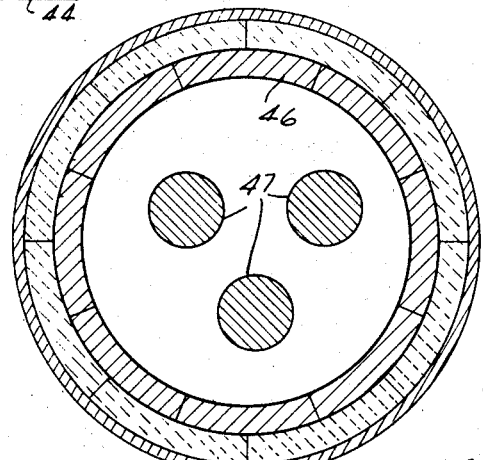
Fig-9
Fig-10
INVENTOR.
CHARLES G. ROBINSON
BY *[signature]* ATTORNEYS

United States Patent Office 3,439,104
Patented Apr. 15, 1969

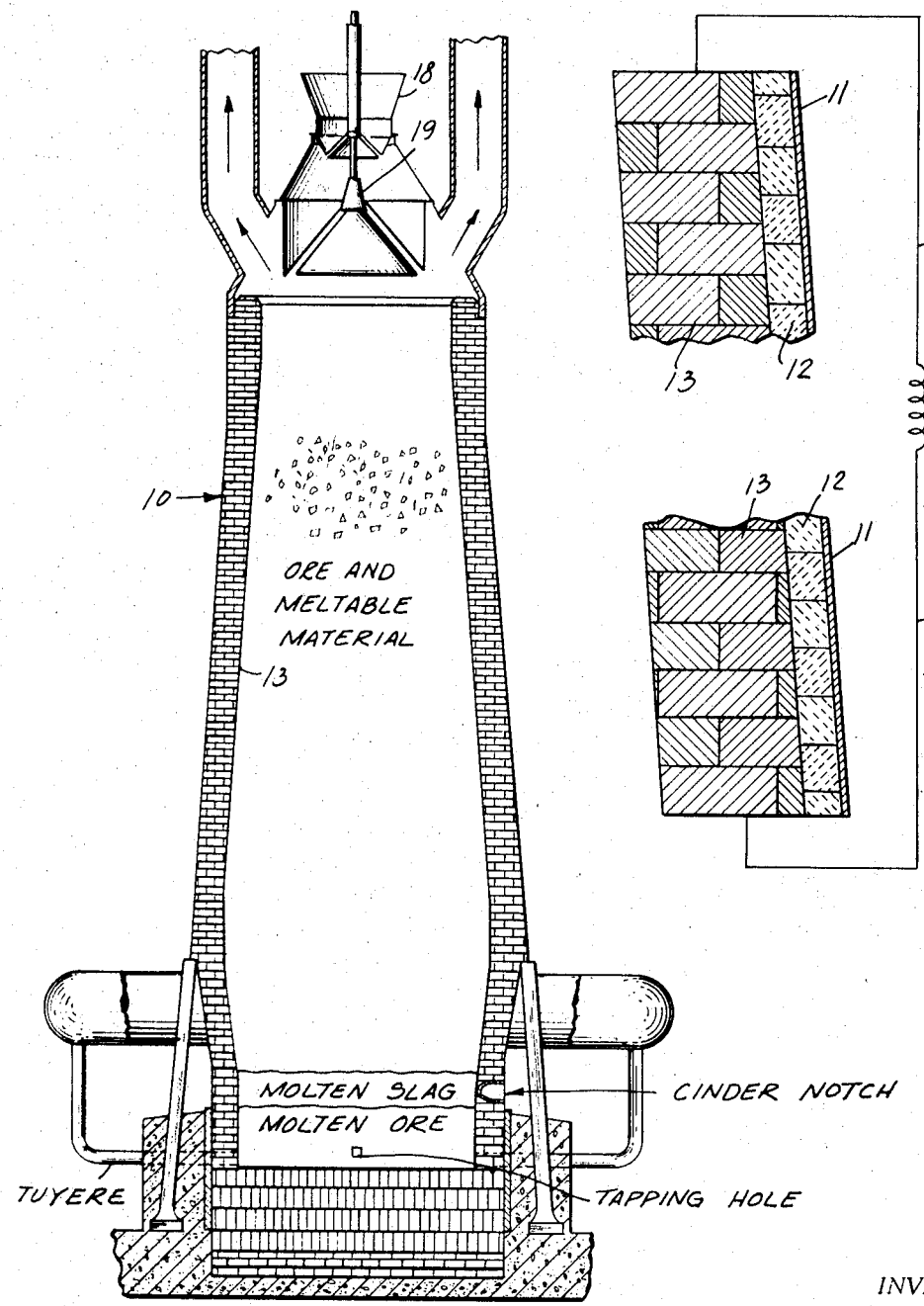
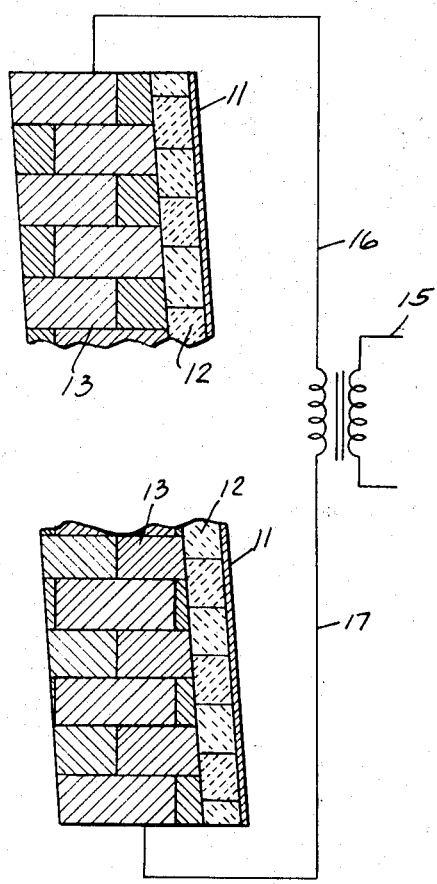

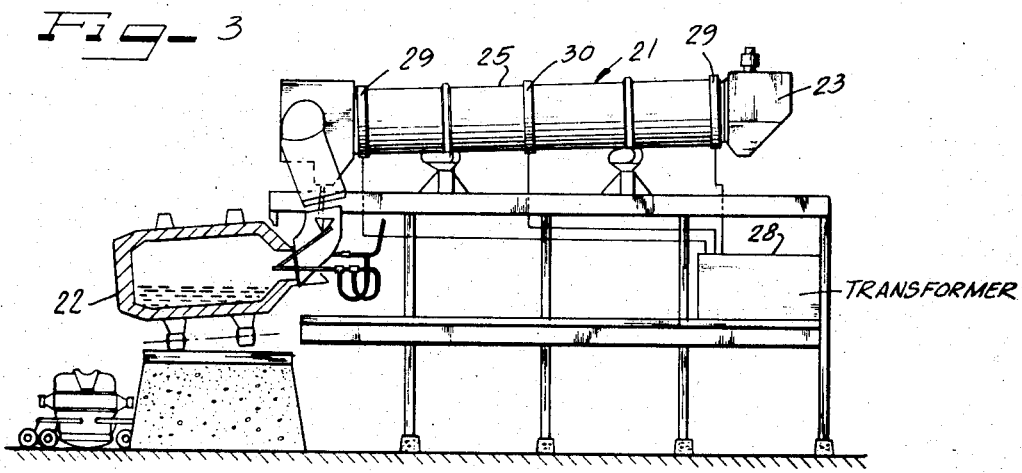
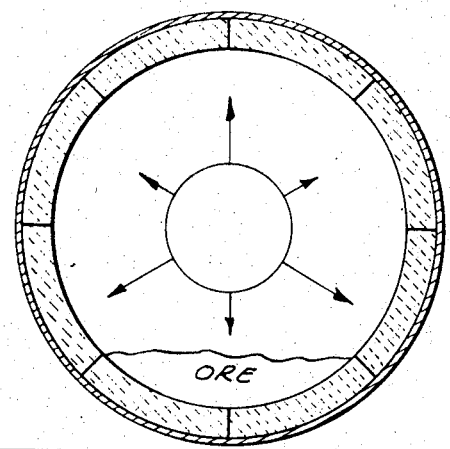
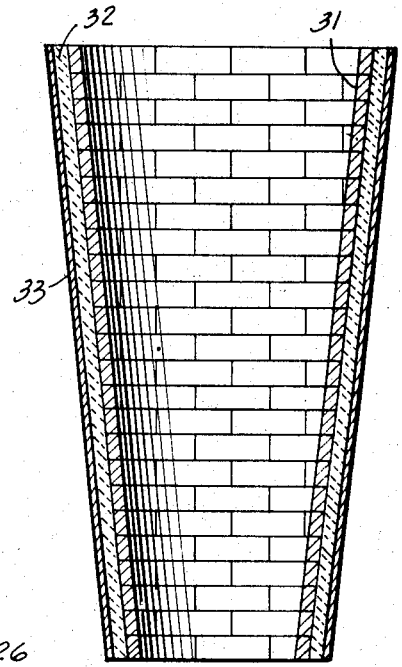
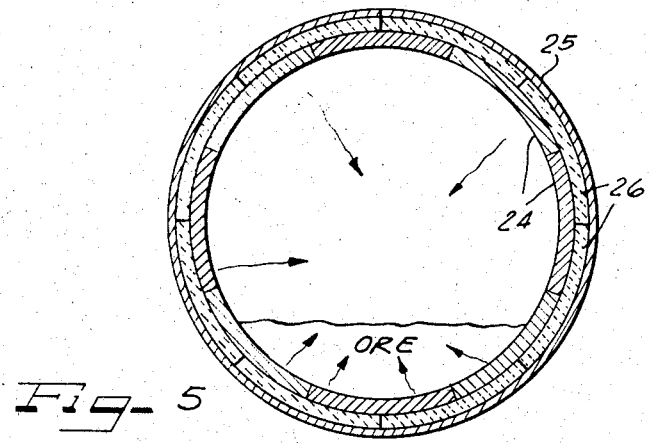

3,439,104
APPARATUS FOR MELTING METALS BY RESISTANCE HEATING
Charles G. Robinson, Sterling, Ill., assignor to Northwestern Steel and Wire Company, Sterling, Ill., a corporation of Illinois
Filed Sept. 22, 1966, Ser. No. 581,390
Int. Cl. H05b 3/62
U.S. Cl. 13—20      3 Claims

ABSTRACT OF THE DISCLOSURE

Electric melting vessel having a lining of refractory brick within the steel shell of the vessel and a lining of resistor brick within the lining of refractory brick. The lining of resistor brick forms a resistance to give the heat for melting when current is passed through the lining from one end thereof to the other. The vessel may be a vertical vessel of the blast furnace type, a rotary kiln type of vessel or may converge from its top to its bottom end. A resistance rod may also extend through the center of the vessel to aid in balancing the heat within the vessel. The lining of resistor brick may also be separated by refractory brick which acts as an insulator and individual transformers may be provided to energize the separate rows of resistor brick to graduate the temperature along the furnace.

---

A principal object of the invention is to provide an improved form of electric melting vessel arranged with a view toward increasing the efficiency of the reduction of ore by applying heat along the wall of a melting vessel and radiating the heat toward the center of the vessel.

Another object of the invention is to provide a novel and improved form of electric melting vessel heating meltable materials by electric heat, radiating inwardly from the wall of a vessel, and so constructed and arranged as to enable fuel fired heat to be applied to the charge without interfering with the electric heating operation.

A further object of the invention is to provide a simple method and apparatus for heating electric melting vessels so arranged as to enable a fuel fired melting vessel to be readily converted into an electric melting vessel.

A still further object of the invention is to utilize a rotatable kiln to supply heat to reduce meltable materials, electrically heated in such a manner as to melt materials resting on the wall of the kiln by conduction and to radiate heat toward the center of the kiln, from all portions of the inner surface of the kiln not covered by meltable materials to thereby increase the efficiency of melting.

Still another object of the invention is to provide a method and apparatus for heating and reducing meltable materials by resistance heating so arranged as to enable a variable heat gradient to be attained throughout the length of the vessel, which may progressively increase from the charge end to the discharge end of the vessel.

A still further object of the invention is to provide an improved method and apparatus for heating meltable materials, in which the heat for melting and reducing the materials radiates inwardly from the wall of the melting vessel and in which the vessel and heating means are so arranged as to enable the meltable materials and reducing gases to be placed under pressure, to facilitate the reducing reactions.

Still another important object of the invention is to improve upon the melting vessels and methods of electric melting heretofore in use, by forming the lining of the melting vessel as a resistor to provide the heat for reducing and melting metals, and to thereby accommodate the use of various reducing gases which would not be possible by combustion methods of heating.

Still another object of the invention is to provide a shaft type electric melting vessel for reducing meltable materials and having an inner face of resistive brick insulated from the wall of the vessel by a refractory and so formed that the weight of the meltable charge will bear upon the vessel walls for proper contact, to obtain a more efficient heat transfer.

Still another object of the invention is to provide an improved form of melting vessel for heating and reducing meltable materials by conduction and radiant heat, in which the radiant heat is attained by passing current through a resistive lining in the vessel, and the lining and vessel are so constructed that alternating or direct current may be passed through the resistive lining.

A still further object of the invention is to provide a simple and improved vessel for melting meltable charges, in which the lining of the vessel is formed from a resistive brick and a resistive heating element is positioned inwardly of the resistive lining to cooperate with the heat radiated by the resistive lining.

Still another object of the invention is to provide a simple and improved system and apparatus utilizing resistive materials of various forms for the lining of a melting vessel, for melting either fine metallic ore, pelletalized ore, lump ore or scrap of various types, in a simple and improved manner.

These and other objects of the invention will appear from time to time as the following specification proceeds and with reference to the accompanying drawings wherein:

FIGURE 1 is a diagrammatic sectional view taken through a shaft type furnace constructed in accordance with the principles of the present invention;

FIGURE 2 is an enlarged detail diagrammatic view of sections of the furnace adjacent the top and bottom of the furnace, illustrating the resistive lining of the furnace and the electrical connections thereto, for passing current through the resistive lining;

FIGURE 3 is a diagrammatic side elevational view of a kiln type furnace constructed to utilize the radiant heat melting principles of the present invention;

FIGURE 4 is a diagrammatic sectional view taken through a kiln type furnace illustrating the heat flow when heating a conventional furnace by a combustible fuel;

FIGURE 5 is a diagrammatic transverse sectional view taken through the furnace shown in FIGURE 3 illustrating the heat flow when heating the meltable material by radiant heat;

FIGURE 6 is a diagrammatic view illustrating still another form of furnace which may be employed to carry out the principles of the present invention;

FIGURE 7 is a diagrammatic view illustrating an arrangement of resistive brick accommodating a control of the heat gradient along the furnace;

FIGURE 8 is a diagrammatic view illustrating a form of furnace operating in accordance with the principles of the present invention having an inner resistor cooperating with the resistance heated wall of a furnace;

FIGURE 9 is a diagrammatic view illustrating the electrical connections to the inner wall of a furnace, and inner resistor like that shown in FIGURE 8, for passing current therethrough; and FIGURE 10 is a sectional view of a vertical furnace having an inner wall formed of resistive material and a plurality of electrodes within the inner wall.

In FIGURES 1 and 2 of the drawings, I have shown a shaft type furnace 10 similar in construction to a blast furnace, which may be of a relatively small diameter, compared to a conventional blast furnace. The furnace 10 has a steel outer face 11, a refractory lining 12 of fire brick or any other suitable refractory material, to conserve heat. The refractory lining 12 backs up a lining 13 of resistor brick forming a resistive inner face of the furnace, extending for substantially the height thereof.

The resistor brick of the resistive lining 13 may be laid in a manner similar to which the refractory brick is laid, that is the brick may be laid without mortar and may fuse together by the heat created by passing a current therethrough, to provide a continuous resistive lining in contact with the material being melted.

As shown in FIGURE 2 a source of current in the form of a transformer 15 is provided to pass current through the resistor brick. The secondary of the transformer 15 is shown as having conductors 16 and 17 leading therefrom having electrical connection with the resistor brick at the top and bottom of the furnace. The electrical connections to the resistor brick may be of any suitable form and are no part of the present invention, so need not herein be shown or described further.

While a single phase transformer is shown as being directly connected with the resistor brick, it should be understood that a multi-phase transformer, or direct current may be used to pass electric current through the resistor brick.

The resistor brick 13 may be of the graphite or carbon family of resistive materials. The brick may also be of a metallic nature, such as nichrome, or may be of any other suitable resistor material through which alternating or direct currents can be passed and which has a materially higher volatilization temperature than the volatilization of steel in the tapping range.

As in a conventional blast furnace, the furnace may be charged from the top with ore, in the form of pellets or other meltable materials, along with a flux in the form of limestone when required. The charge is through a hopper 18 and bell 19 in a manner conventionally used to charge blast furnaces, and no part of the present invention so not herein shown or described further.

Coke and wind may be blown through the tuyeres to produce reducing gas which passes off through the charge, to prereduce and preheat the charge.

It should here be understood that the apparatus and process of the present invention make it possible to convert a conventional blast furnace to an electric furnace by the simple process of lining the refractory brick of the furnace with a resistor brick and thereby form the inner face of the furnace into a resistor.

In FIGURE 3 of the drawings I have diagrammatically shown a rotating kiln 21 extending generally horizontally, but tilted upwardly at a slight angle from its discharge to its charge end, to accommodate the free flow of metal through the discharge end of the kiln into a reduction furnace 22, disposed beneath the discharge end of the kiln, which may reduce the liquid charge to steel. The kiln 21 and reduction furnace 22 form a part of a process termed the Dored iron making process developed by Swedish steelmakers except that in the Dored process the kiln is heated by the combustion of fuel, whereas in the present form of the invention the kiln is heated by resistive heat. In the present process, ore of any kind, together with coke breeze or coal are charged into a hopper 23 at the charge end of the kiln 21. The kiln is rotatably driven by power and the heat for melting and reducing the ore is attained by passing current through a resistive lining 24 of the furnace. The melted and reduced ore may then be directly discharged into the reduction furnace 22, converting the reduced ore to steel. In carrying out the process, the furnace is charged with enough fine coke or similar solid carbonaceous material that a reduction layer or bed of several inches in thickness is obtained on the furnace bottom. This bed is then heated to about 1,300° C. and a small amount of slag may be added for start up.

Powdered ore and coke may then be fed continuously into the bed and lime may be added in order to get a suitable slag composition. Oxygen may be blown over the surface of the ore during the melting operation to effect the reduction of the ore by the carbon in the bed, giving metallic oxide and carbon monoxide, which is burnt to carbon dioxide by the oxygen giving heat to the reduction.

FIGURE 4 diagrammatically shows a cross-section of a kiln of a type used in the Dored process, showing the fuel fed into the kiln along the center of the kiln and radiating heat outwardly from the burner to the ore and refractory lining of the furnace.

FIGURE 5 is a cross sectional view taken through the furnace of FIGURE 3 and illustrating the reduction of the ore by the apparatus of the present invention. This figure shows a steel shell 25 for the furnace, a refractory inner lining 26 and the resistive brick lining 24 forming the inner face of the kiln and radiating heat from the inner face of the kiln toward the center of the kiln.

It may be seen from FIGURE 5 that since the heat is originated on the inner face of the kiln supporting the meltable materials, the heat originating in the inner surface of the kiln thus flows upwardly or radially inwardly by conduction into the meltable material, and the balance of the face of the kiln radiates heat radially inwardly to supply heat to the top of the meltable material by radiation. With the heat supplied from the inner face of the kiln toward the center of the kiln, approximately 30% more kiln area is available to supply heat and since a combustible material and reducing atmosphere is not required to supply the heat of reduction, the kiln may be pressurized with a resultant increase in yield from the reducing gases.

In FIGURE 3 the energizing circuit to the inner resistive face 24 of the kiln 21 is shown as being a three-phase transformer 28, two phases of which have electrical connection with the resistive lining through slip rings 29 at opposite ends of the furnace and a third phase of which has electrical connection with the resistive lining through a slip ring 30 intermediate the ends of the kiln.

The slip rings 29 and 30 as well as the connections from the transformer 28 to said slip rings and the current conducting connections from said slip rings to the resistive lining 24 of the furnace may be of any suitable form, and are no part of the present invention so need not herein be shown or described further.

In FIGURE 6 we have diagrammatically shown still another form of shaft furnace having a frusto-conical resistive lining 31, backed up by a refractory lining 32 enclosed in a steel shell 33. In this form of the invention the furnace is larger in diameter at its top than at its bottom and the diameter ratio of the top to the bottom of a furnace must be correlated with respect to the height of the furnace for the particular type of material being melted to effect a maximum heat transfer through the meltable charge.

As for example, where ores or materials in the furnace have a low specific heat, as compared with scrap, and have good contact with the wall of the furnace the diameter ratio between the charge and discharge end of the furnace should be somewhat greater than a scrap melting vessel where the scrap has poor contact with the wall of the furnace.

That is, materials of high resistance must have a greater shaft height and taper per foot to assure they have adequate contact for the resistive lining to transfer the heat into the charge by conduction. As the charge progresses down the shaft and has absorbed heat and approaches the melting point, the volume of the charge decreases so the the wall or containing area of the furnace toward its discharge end may be smaller.

The heat absorption rate, therefore, is contingent upon the type of charge in the furnace and where the furnace is a kiln and converges from its charge to its discharge end, as in FIGURE 6, and the ore or meltable materials are relatively small in diameter, with a resultant greater contact against the heated surface in comparison with pellets having less contact, and scrap having considerably less contact area with the wall of a furnace, a greater amount of heat will flow into the materials by conduction and less heat will be attained by the radiation of heat from the noncontacted area. In scrap, a lesser amount of heat flows into the scrap by conduction and a greater amount of heat is gained by radiation from the noncontacted area.

The diameter ratio and height or length of the furnace may thus be varied to suit the particular material being melted to effect a uniform melting rate of the charge.

In FIGURE 7, I have shown a resistor brick lining arrangement which may be applied to a kiln type of furnace or to a vertical shaft type of furnace. In this form of the invention, a resistor brick 35 extends about the furnace in spaced rows and is separated by insulators 36, which may be refractory brick. Each row of resistor brick is shown as being energized by an individual transformer 37. The individual rows of resistor brick may also be energized through different transformer connections of a single transformer or direct current may be passed through the separated rows of resistor brick. With this arrangement, a graduated temperature from the charge to discharge end of the furnace which gradually increases from the top to the bottom of the furnace may be attained. Thus, a lower temperature may be maintained at the top of the furnace to in effect preheat the charge, and the temperature may progressively increase to a high temperature for melting the charge as the charge passes to the discharge end of the furnace.

In FIGURE 8 I have shown still another modification of the invention in which the furnace has an outer steel shell 39, a refractory lining 40 lining the inside of the shell and a resistor brick lining 41 backed up by the refractory lining. Direct or alternating current may be passed through the resistor lining 41 as in the forms of the invention shown in FIGURES 1 through 7. Concentric with the resistor brick lining 41 is an inner resistor 43, which may be made from a carbon material and cooperates with the resistor brick liner 41 to supply heat by radiation to the charge within the furnace.

FIGURE 9 diagrammatically illustrated a kiln type furnace utilizing the principles of FIGURE 8 and shows a transformer 44 passing current through the inner resistor element 43, and a second transformer 45 connected to pass heat through the interior peripheral resistor lining 41 for the furnace. With this type of furnace, the required gases can be fed into the furnace up through the central portion thereof in the space between the resistor brick lining 41 and the concentric inner resistor 43, to act as catalyzers to the reactions.

In FIGURE 10 I have shown an arrangement somewhat similar to that shown in FIGURE 8 with a resistor brick lining 46 and three central electrodes 47 spaced equal distances apart and equal distances from the resistor brick lining. The electrodes may be energized in the same manner as the electrodes of an electric arc furnace. The number of electrodes used is, of course, dependent upon the winding characteristics of the transformer.

It may be seen from the foregoing that I have provided a novel and simple means for heating a furnace for melting and reducing meltable materials, which may be used as a primary heat source or which may operate in cooperation with fuel fired heat or electric arc heat, and that by the method and apparatus of the present invention, conventional fuel fired furnaces may be converted to electric furnaces by the simple expedient of lining the refractory lining of the furnace with a resistor brick, and passing current through the brick either by direct or alternating current.

It may further be seen that the various forms of furnaces disclosed apply heat to all portions of the material in contact with the wall of the furnace by conduction in addition to radiating heat to the surfaces of the material out of contact with the resistive wall of the furnace.

It may further be seen that the method and apparatus of the invention is particularly adapted for heating meltable materials under pressure, where pressure is required to facilitate the reactions and that the various reducing gases required may be admitted to the furnace in controlling quantities not possible by combustion methods of melting.

It may further be seen that infinite control over the heat gradient throughout the entire length of the furnace may be attained by the use of either alternating or direct current, and that the furnace may operate in cooperation wtih a fuel fired furnace or an electric arc type of furnace, to attain a more even distribution of heat over meltable materials in the furnace.

While I have herein shown and described several forms in which the invention may be embodied, it may readily be understood that various variations and modifications in the invention may be attained without departing from the spirit and scope of the novel concepts thereof.

I claim:

1. In an electric melting vessel, a steel shell having an interior wall, an inlet for the charge at the top of said shell, and outlet for the molten metal at the bottom of said shell, an interior refractory lining for the wall of said shell, the improvement comprising:

a lining of resistor brick backed up by said refractory lining and forming the inner wall of the vessel, a source of electric power, and at least two electrical conductors leading from said source of power and having electrical connection with said lining of resistor brick adjacent opposite ends thereof to energize said resistor brick and create the heat for melting, at least one resistor extending along the interior of the melting vessel in spaced relation with respect to the resistor brick, and a source of power independent of said source of power for energizing said resistor brick, having energizing connection with opposite ends of said resistor.

2. The structure of claim 1:

wherein the source of power comprises a three-phase transformer, and wherein current conducting connections are provided from each phase of said transformer to said resistor brick, two phases being connected with said resistor brick adjacent opposite ends thereof, and the third phase being connected with said resistor brick intermediate the ends thereof.

3. In an electric melting vessel having a steel shell having an inner wall, a refractory brick lining for said inner wall of said shell, an outlet from the bottom of said shell, an inlet into said shell adjacent the top thereof, the improvement comprising:

resistor heating means extending along the interior of said refractory lining, including:

a plurality of sources of power, a plurality of rows of resistor brick backed up by said refractory lining and extending thereabout, refractory brick separating said rows of resistor brick, and energizing circuits from said sources of power to said rows of resistor brick, independently energizing said rows of resistor brick and operable to vary the temperature of the vessel from the top to the bottom thereof and maintain a graduated temperature along the melting vessel, higher at its bottom end than at its charging end.

References Cited

UNITED STATES PATENTS

| | | | |
|---|---|---|---|
| 726,860 | 5/1903 | Carrere | 13—3 |
| 750,095 | 1/1904 | Cowles | 13—20 |
| 825,058 | 8/1906 | Johnson | 13—21 |
| 1,937,064 | 11/1933 | Moore | 13—20 |
| 1,299,336 | 4/1919 | Hechenbleikner | 13—23 |

ROBERT K. SCHAEFER, *Primary Examiner.*

MORRIS GINSBURG, *Assistant Examiner.*

U.S. Cl. X.R.

13—3, 21